April 5, 1938.　　　F. C. BEST　　　2,112,981
MOTOR VEHICLE
Filed June 12, 1936
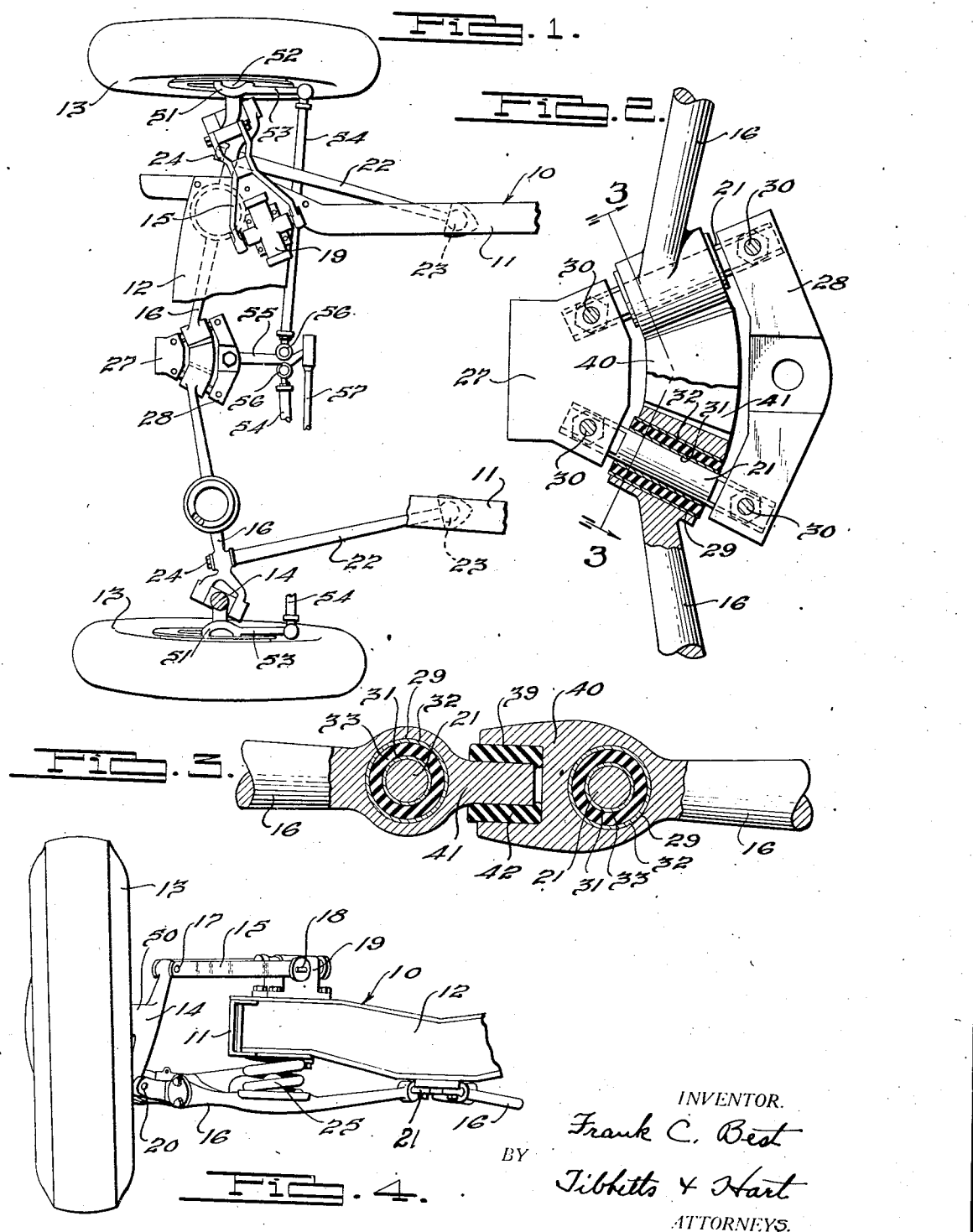
INVENTOR.
Frank C. Best
BY Tibbetts & Hart
ATTORNEYS.

Patented Apr. 5, 1938

2,112,981

UNITED STATES PATENT OFFICE 2,112,981

MOTOR VEHICLE

Frank C. Best, Detroit, Mich., assignor to Packard Motor Car Company, Detroit, Mich., a corporation of Michigan Application June 12, 1936, Serial No. 84,904

10 Claims. (Cl. 267—11)

This invention relates to motor vehicles and more particularly to body stabilizing mechanism.

There are times in the operation of a vehicle when the body, flexibly connected with the wheels, will sway or tilt sideways unless some form of stabilizing mechanism is provided. One of the times that this body tilting will occur is during changes in the direction of vehicle travel and, obviously, such body tilting is quite objectionable to the occupants.

Various control or stabilizing mechanisms have been proposed to prevent the side tilting of vehicle bodies, and it is now the practice to equip motor vehicles with such mechanism usually in the form of a torsion member extending transversely of and beneath the body. These tension members are in some instances fixed to movable portions of shock absorbers associated with the mountings of oppositely disposed road wheels and in other instances they are mounted on the frame and connected to the wheel mountings. These arrangements of torsion mechanisms often interfere with the desired location of vehicle parts beneath the body and, as a result, such parts or the torsion member must be located in an undesirable relation. This type of torsion member is also relatively costly because of its length and the high quality of material required.

An object of the invention is to provide a compact form of body stabilizing mechanism which can be installed in a small space and out of interfering relation with the undercarriage parts of a vehicle.

Another object of the invention is to provide a low cost and efficient stabilizing mechanism for vehicle bodies by connecting the adjacent portions of oppositely disposed independently rocking wheel carrying axle means.

A further object of the invention is to provide a vehicle body stabilizing mechanism by interconnecting oppositely disposed independently mounted wheel carrying axle means so that they will move similarly after a slight movement of one relative to the other.

Other objects of the invention will appear from the following description taken in connection with the drawing, which forms a part of this specification, and in which:

Fig. 1 is a plan view of the front end of a motor vehicle chassis having the invention incorporated therewith;

Fig. 2 is an enlarged plan view, partly broken away, of the connection between the front wheel mountings;

Fig. 3 is a sectional view of the connection taken on line 3—3 of Fig. 2;

Fig. 4 is a fragmentary front elevational view of the motor vehicle chassis shown in Fig. 1.

Referring now to the drawing by characters of reference, the load carrying or body supporting means of a motor vehicle is indicated generally by the numeral 10. Such means, in this instance, is in the form of a frame consisting of longitudinally extending side sills 11 joined together by brace members, the front brace member being indicated at 12.

On opposite sides of the front end of the frame are steering road wheels 13, each of which is carried by an axle means connected with the frame for independent vertical rising and falling movement. These axle means are similar and a description of one will suffice. The carrier 14 extends at a slight angle to the vertical centerline of the wheel and is connected with the frame by substantially parallel links 15 and 16. The upper link 15 is pivoted at 17 to the upper end of the link 15 is pivoted at 17 to the upper end of the carrier and is fixed to shaft 18 at its inner end, such shaft forming a movable part of a hydraulic shock absorber 19 fixed to an adjacent portion of the frame. The outer end of the lower link 16 is pivoted at 20 to the lower end of the carrier 14 and at its inner end is pivoted on a pin 21. Associated with this lower link 16 is a radius member 22 having its rear end 23 pivoted to the adjacent side sill and its forward end fixed to the link 16 by the bolt 24. This radius rod is integral with the lower link 16 and together they form a Y-shaped lower link structure. The pivotal connections 21 and 23 are preferably in alignment and a line therebetween extends at an obtuse angle to the longitudinal centerline of the main frame. The upper link is arranged so that its longitudinal axis extends in a line perpendicular to a line drawn through the pivotal lines of the lower link structure. Between the lower link and the main frame is arranged a coil spring 25 which together with the shock absorber 19 restricts the vertical movement of the wheel carrier means relative to the main frame.

The pins 21 are provided with flattened ends which bear against brackets 27 and 28 beneath the central portion of the front cross brace member 12. Bolts 30 extend through the pins and the brackets to fix them to the frame cross member. Fixed on each pin is a sleeve 31 and fixed in openings 29 adjacent the ends of links 16 are sleeves 32 and intermediate the adjacent sleeves 31 and 32 is vulcanized a rubber bushing 33. These rubber bushings are arranged so that they resist movement of the links in directions away from normal position.

In order to provide stabilizer mechanism to prevent the body from swaying materially when the vehicle changes its course, I propose to provide motion transfer or driving means directly between the opposite axle means. In the present instance, the lower link members 16 are formed with extensions 40 and 41 on their inner ends which are connected to provide a driving relation therebetween. The extension 40 is provided with a recess 39 in its end into which the extension 41 is inserted to establish motion transfer or driving means between the links so that movement of one link will thus be transferred to the other link. A positive driving connection between the links is objectionable because motion will be transferred at all times when either one of the wheels rises or falls from a normal position and, because of this, occupants of the body will be conscious of all road surface irregularities encountered during a boulevard ride. In order to overcome this condition, I provide a rubber sleeve 42 in the recessed end of the extension 40 which surrounds the extension 41 and provides what may be termed a lost motion connection between the extensions. In other words, either one of the links 16 can move slightly and compress the rubber sleeve 42 to a small extent before its motion is transferred to the other link. Either wheel can thus encounter small irregularities in the road surface without transmitting their motion to the other wheel.

It will be seen that this manner of providing body stabilizing mechanism requires only the space between the adjacent inner ends of the lower links of the axle means and will in no way interfere with the arrangement or movement of other parts located beneath the frame. At the same time, this form of stabilizing mechanism is efficient when the vehicle is changing its course of travel and provides for a relatively smooth boulevard ride. Due to the simplicity of the stabilizing mechanism it can be made for a low cost.

The wheels are pivotally mounted in the usual way on the carriers 14 for steering movement, the carriers having a horizontally extending spindle portion 50 upon which a sleeve portion 51 is held by the king pin 52 in the usual manner. A steering arm 53 is fixed to each sleeve 51 and is pivotally connected to the steering cross rods 54. Pivoted to the cross brace member 12 of the frame is a link 55 and the inner ends of the cross steering rods 54 are pivotally mounted to the link 55 as at 56. Conventional steering mechanism 57 is connected with the link 55 for swinging the same to move the cross steering rods 54 to thereby rotate the wheels for the steering movement. This steering mechanism is conventional and forms no part of the present invention.

It will be understood that the body stabilizer mechanism herein described can be applied to independent mountings for wheels other than steering wheels in the same manner as described, the invention being shown associated with steering wheel mountings for purposes of illustration.

Although the invention has been described in connection with a specific embodiment, the principles involved are susceptible of numerous other applications which will readily occur to persons skilled in the art. The invention is therefore to be limited as indicated by the scope of the appended claims.

What is claimed is:
1. In a vehicle, the combination with a pair of opposite independently suspended wheel carrying axle means each of said means including a link extending at an angle to and terminating adjacent the longitudinal centerline of the vehicle, of a lost motion connection directly between the inner end portions of said links.

2. In a vehicle, the combination with a pair of independently mounted wheel carrying axle means on opposite sides of the vehicle, of a lost motion transferring connection comprising means fixed to the axle means and resilient means between the means fixed to the axle means.

3. In a vehicle, a frame, a pair of road wheels disposed adjacent one end of said frame at opposite sides thereof, means carrying each of said wheels on said frame for rising and falling movement with respect to said frame, each of said wheel carrying means including a link having a resilient pivotal connection with said frame, and a direct connection between said links for transferring similar motion from one to the other.

4. In a vehicle, a chassis, a pair of oppositely disposed wheel carrying links extending transversely of the chassis, the inner ends of said links being engaged to move together, and pivot means on said chassis on which an intermediate portion of said links are mounted.

5. In a vehicle, a chassis, a pair of oppositely disposed wheel carrying links extending transversely of the chassis, means on the chassis on which an intermediate portion of each link is pivotally mounted, and extensions on the inner ends of said links arranged in telescoping relation for transmitting motion from one to the other.

6. In a vehicle, a chassis, a pair of oppositely disposed wheel carrying links extending transversely of the chassis, means on the chassis on which an intermediate portion of each link is mounted, extensions on the inner ends of said links interacting to transmit motion from one to the other, and resilient means intermediate the interacting portions of said extensions.

7. In a vehicle, a pair of oppositely disposed wheel carrying links extending transversely of and pivoted intermediate their ends to the vehicle, extensions on the inner ends of the links in telescoping relationship, and a rubber sleeve intermediate the telescoping extensions.

8. In a vehicle, the combination of a pair of independently suspended wheel carrying axle means each including a link pivoted for up and down rocking movement transversely of the vehicle, extension means fixed to said links and interengaging to transmit similar motion from one to the other, and resilient means separating said interengaging extension means.

9. In a vehicle, the combination with a pair of opposite independently suspended wheel carrying axle means each including a link extending at an angle to and terminating short of the longitudinal centerline of the vehicle, of a connection directly between the inner end portions of said links.

10. In a vehicle, the combination with a pair of pivoted wheel carrying axle means extending at an angle to the longitudinal centerline of the vehicle, of interengaging motion transfer means integral with said axle means.

FRANK C. BEST.